United States Patent
Legaspi (10) Patent No.: US 12,471,002 B2
(45) Date of Patent: Nov. 11, 2025

(54) TARGET HOMING OPTIMIZED ROUTING PROTOCOL OVER AN AERIAL SERVICE GATEWAY RELAY DOMAIN

(71) Applicant: United States of America as represented by the Secretary of the Navy, San Diego, CA (US)

(72) Inventor: Albert Kitagawa Legaspi, San Diego, CA (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 421 days.

(21) Appl. No.: 18/150,644

(22) Filed: Jan. 5, 2023

(65) Prior Publication Data

US 2024/0236817 A1 Jul. 11, 2024

(51) Int. Cl.
*H04W 40/30* (2009.01)
*H04W 40/24* (2009.01)
*H04W 84/18* (2009.01)

(52) U.S. Cl.
CPC ......... *H04W 40/30* (2013.01); *H04W 40/248* (2013.01); *H04W 84/18* (2013.01)

(58) Field of Classification Search
CPC ...... B64C 39/024; G05D 1/104; G05D 1/227; G05D 1/0088; G05D 1/695; H04B 7/18504; H04B 7/024; H04W 24/02; H04W 4/40; B64U 2201/10; B64U 2101/20; B64U 2201/104; B64U 2101/30; B64U 2201/102; B64U 10/10; B64U 2201/20

See application file for complete search history.

(56) References Cited

U.S. PATENT DOCUMENTS

| 8,451,807 B2 * | 5/2013 | Yi ........................... H04L 45/20 370/400 |
| 12,133,156 B2 * | 10/2024 | Wang ..................... H04W 28/06 |

(Continued)

OTHER PUBLICATIONS

P. Lalwani, S. Silakari and P. K. Shukla, "Optimized and Executive Survey on Mobile Ad-hoc Network," 2012 International Symposium on Cloud and Services Computing, 2012, pp. 31-35, doi: 10.1109/ISCOS.2012.37.

(Continued)

*Primary Examiner* — Jung Liu
(74) *Attorney, Agent, or Firm* — Naval Information Warfare Center Pacific; Kyle Eppele (57) ABSTRACT

A target homing optimized routing protocol over an aerial service gateway relay domain. A method of proactive routing comprising the steps of designating each node of a plurality of nodes within a mobile ad-hoc network as either one of a plurality of target homeport nodes, one of a plurality of comms-relay nodes, or one of a plurality of sensor nodes, initializing a target homing optimized protocol by propagating a plurality of route chains to each of the plurality of comms-relay nodes and each of the plurality of sensor nodes, maintaining the plurality of route chains at each of the plurality of nodes, wherein a plurality of routing tables, each associated with one of the plurality of nodes, comprises the plurality of route chains, generating sensor information at the plurality of sensor nodes, and selectively transmitting the sensor information to the plurality target homeport nodes along a primary route chain.

15 Claims, 8 Drawing Sheets

10 Aerial Service Gateway Relay Dimension (ASGRD)

(56) References Cited

U.S. PATENT DOCUMENTS

| | | | |
|---|---|---|---|
| 12,189,622 B2* | 1/2025 | Li | G06F 16/2246 |
| 2008/0151841 A1* | 6/2008 | Yi | H04L 45/22 |
| | | | 370/338 |
| 2020/0296028 A1* | 9/2020 | Nainar | H04L 45/748 |
| 2020/0328972 A1* | 10/2020 | Ramanujan | H04W 40/00 |
| 2023/0354153 A1* | 11/2023 | Liu | H04L 45/16 |
| 2025/0013238 A1* | 1/2025 | Shattil | B64C 39/024 |

OTHER PUBLICATIONS

D. N. Patel, S. B. Patel, H. R. Kothadiya, P. D. Jethwa and R. H. Jhaveri, "A survey of reactive routing protocols in MANET," International Conference on Information Communication and Embedded Systems (ICICES2014), 2014, pp. 1-6, doi: 10.1109/ICICES.2014.7033833.

A. Srivastava, A. Mishra, B. Upadhyay and A. k. Yadav, "Survey and overview of Mobile Ad-Hoc Network routing protocols," 2014 International Conference on Advances in Engineering & Technology Research (ICAETR—2014), 2014, pp. 1-6, doi: 10.1109/ICAETR.2014.7012959.

Eiman Alotaibi, Biswanath Mukherjee, "A survey on routing algorithms for wireless Ad-Hoc and mesh networks," Computer Networks: The International Journal of Computer and Telecommunications Networking, vol. 56, No. 2, Oct. 2011, pp. 940-965, ISSN 1389-1286, https://doi.org/10.1016/j.comnet.2011.10.011.

Mohammed Tarique, Kemal E. Tepe, Sasan Adibi, Shervin Erfani, Survey of multipath routing protocols for mobile ad hoc networks, Journal of Network and Computer Applications, vol. 32, Issue 6, 2009, pp. 1125-1143, ISSN 1084-8045, https://doi.org/10.1016/j.jnca.2009.07.002.

R. Shenbagapriya and N. Kumar, "A survey on proactive routing protocols in MANETs," 2014 International Conference on Science Engineering and Management Research (ICSEMR), 2014, pp. 1-7, doi: 10.1109/ICSEMR.2014.7043630.

S. Umamaheswaran, Naresh Kumar, and P. K. Biswas, "A survey of routing protocol design patterns for mobile ad hoc networks," IEEE 2nd International Conference on Emerging Technology Trends in Electronics, Communication and Networking (ET2ECN),2014.

* cited by examiner

70 designating each node of a plurality of nodes within a mobile ad-hoc network as either one of a plurality of target homeport nodes, one of a plurality of comms-relay nodes, or one of a plurality of sensor nodes initializing a target homing optimized protocol by propagating a plurality of route chains to each of the plurality of comms-relay nodes and each of the plurality of sensor nodes maintaining the plurality of route chains at each of the plurality of nodes, wherein a plurality of routing tables, each associated with one of the plurality of nodes, comprises the plurality of route chains generating sensor information at the plurality of sensor nodes;

selectively transmitting a sensor product message comprising the sensor information to the plurality target homeport nodes along a primary route chain.

Fig. 7

TARGET HOMING OPTIMIZED ROUTING PROTOCOL OVER AN AERIAL SERVICE GATEWAY RELAY DOMAIN

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwc_patent.fct@us_navy.mil, referencing Navy Case 106,929.

FIELD OF USE

The present disclosure pertains generally to proactive routing protocols in mobile ad-hoc networks.

BACKGROUND

A mobile ad hoc network is a collection of wireless nodes that dynamically form networks to facilitate data transmission. Complexity of routing traffic will vary depending on the mobility and capability of nodes in the network. At one extreme, route computation would be challenging given that nodes are able to move in a random fashion and are able to generate/receive data. In such cases, there are a number of traditional proactive, reactive and hybrid ad-hoc routing protocols that can support route selection. However, these mobile ad hoc networks face challenges with efficient routing, managing network topology, and reliability. Accordingly, advancements in routing protocols are critical to manage data transmission and optimize performance.

Types of existing routing protocols include reactive protocols and proactive protocols. Reactive protocols (i.e. on-demand protocols) perform a route path discovery procedure and require destination nodes to reply in order to establish a route path in the network. This requires minimal network overhead because route paths are established on an as needed basis. In some reactive protocols, route paths may be saved to a route table for future use, but these tables are not periodically maintained and, accordingly, are subject to linkage failures. Some examples of reactive routing protocols include Dynamic Source Routing ("DSR"), Ad hoc On-demand Distance Vector routing ("AODV"), and Temporary Ordered Routing Protocol ("TORP").

Alternatively, proactive protocols continuously maintain a routing table of route paths at each node throughout the mobile ad hoc network. Each source node may transmit to any destination node as needed by referencing their own periodically-maintained route table. While maintaining a routing table increases overhead, latency decreases. Routing tables may update periodically to incorporate information regarding network outages or broken links. Examples of proactive routing protocols may include Destination Sequence Distance Vector ("DSDV"), Global State Routing ("GSR"), Optimized Link State Routing Protocol ("OLSR"), and Hierarchical State Routing ("HSR"). By further optimizing protective routing protocols, one could achieve numerous benefits including improved efficiency and reliability.

SUMMARY

According to illustrative embodiments, a method of proactive routing comprising the steps of designating each node of a plurality of nodes within a mobile ad-hoc network as either one of a plurality of target homeport nodes, one of a plurality of comms-relay nodes, or one of a plurality of sensor nodes, initializing a target homing optimized protocol by propagating a plurality of route chains to each of the plurality of comms-relay nodes and each of the plurality of sensor nodes, maintaining the plurality of route chains at each of the plurality of nodes, wherein a plurality of routing tables, each associated with one of the plurality of nodes, comprises the plurality of route chains, generating sensor information at the plurality of sensor nodes, and selectively transmitting the sensor information to the plurality target homeport nodes along a primary route chain. Moreover, the method of proactive routing of claim 1, wherein initializing a target homing optimized protocol further comprises initiating a route message at each of the plurality of target homeport nodes, the route message comprising each target homeport's address and a sequence number; receiving the route message at a plurality of comms-relay nodes within line of sight of the at least one target homeport node; caching the route message in the routing table at each of the plurality of comms-relay nodes, wherein the route message comprises the route chain associated with a pathway from the target homeport node to each of the plurality comms-relay node; appending a unique address associated with each of the comms-relay node to the route message; transmitting the route message to the plurality of comms-relay nodes or a plurality of nearby sensor nodes within line of sight; and repeating steps (b)-(e) at each of the comms-relay nodes until the route message is received by the plurality of sensors nodes, wherein the route message comprises Additionally, at least one non-transitory computer-readable medium, storing program instruction that when executed by a processor perform a method of proactive routing, the method comprising: designating each node of a plurality of nodes within a mobile ad-hoc network as either one of a plurality of target homeport node, one of a plurality of comms-relay node, or one of a plurality of sensor nodes; initializing a target homing optimized protocol by propagating a plurality of route chains to each of the plurality of comms-relay nodes and each of the plurality of sensor nodes; maintaining the plurality of route chains at each of the plurality of nodes, wherein a plurality of routing tables, each associated with one of the plurality of nodes, comprises the plurality of route chains; generating sensor information at the plurality of sensor nodes; selectively transmitting the sensor information to the plurality target homeport nodes along a primary route chain.

Furthermore, a plurality of wireless mobile nodes, further comprising a plurality of sensor nodes configured to generate sensor information, a plurality of comms-relay nodes configured to relay the sensor information, a plurality target homeport configured to transmit to a central processing node, wherein each of the plurality of nodes, maintain a routing table, further comprising at least two route chains, selectively transmitting the sensor information to at least one target homeport nodes along a primary route chain.

It is an object to provide a Target Homing Optimized Routing protocol over an Aerial Service Gateway Relay Domain that offers numerous benefits, including a reduction in network overhead associated with route discovery that will, among other things, improve energy utilization. Consequently, a Target Homing Optimized Routing ("THOR") will enable all nodes to maintain alternative paths to the destination and improve the robustness of the ad hoc mobile network. This route establishing mechanism may enable intermediate nodes to maintain primary and alternative routing to neighbors through passive collection to maintain resiliency in route in case of link failures.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed method, apparatus, and system below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other method, apparatus, and system described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

A Target Homing Optimized Routing ("THOR") protocol is an efficient and resilient layer 3 (e.g. network layer) ad hoc routing protocol and route caching mechanism that defines a routing infrastructure to enable the transmission of packets from a mobile sensor node to a target homeport node. The protocol is used to build and maintain routes to a target homeport node with a mobile ad hoc network. The mobile ad hoc network may be composed of at least three nodes, each of which are one of the following types: sensor node, target homeport node, or communication relay ("comms-relay") node. Because sensor nodes are deployed to gather information and may be beyond line-of-sight from a target homeport node, comms-relay nodes may extend the range of the mobile at hoc network. The topology of the comms-relay nodes should be managed to stabilize network connectivity, but this is performed outside of the THOR protocol.

As used herein, the terms "node," "nodes," "wireless node," or any variation thereof are employed to be inclusive of all the aforementioned node types.

As used herein, the terms "route path" and "route chain" are employed to describe a sequence of nodes contained within a route table that indicates a path or partial path from at least one sensor node to at least one target homeport node.

Figure 1:
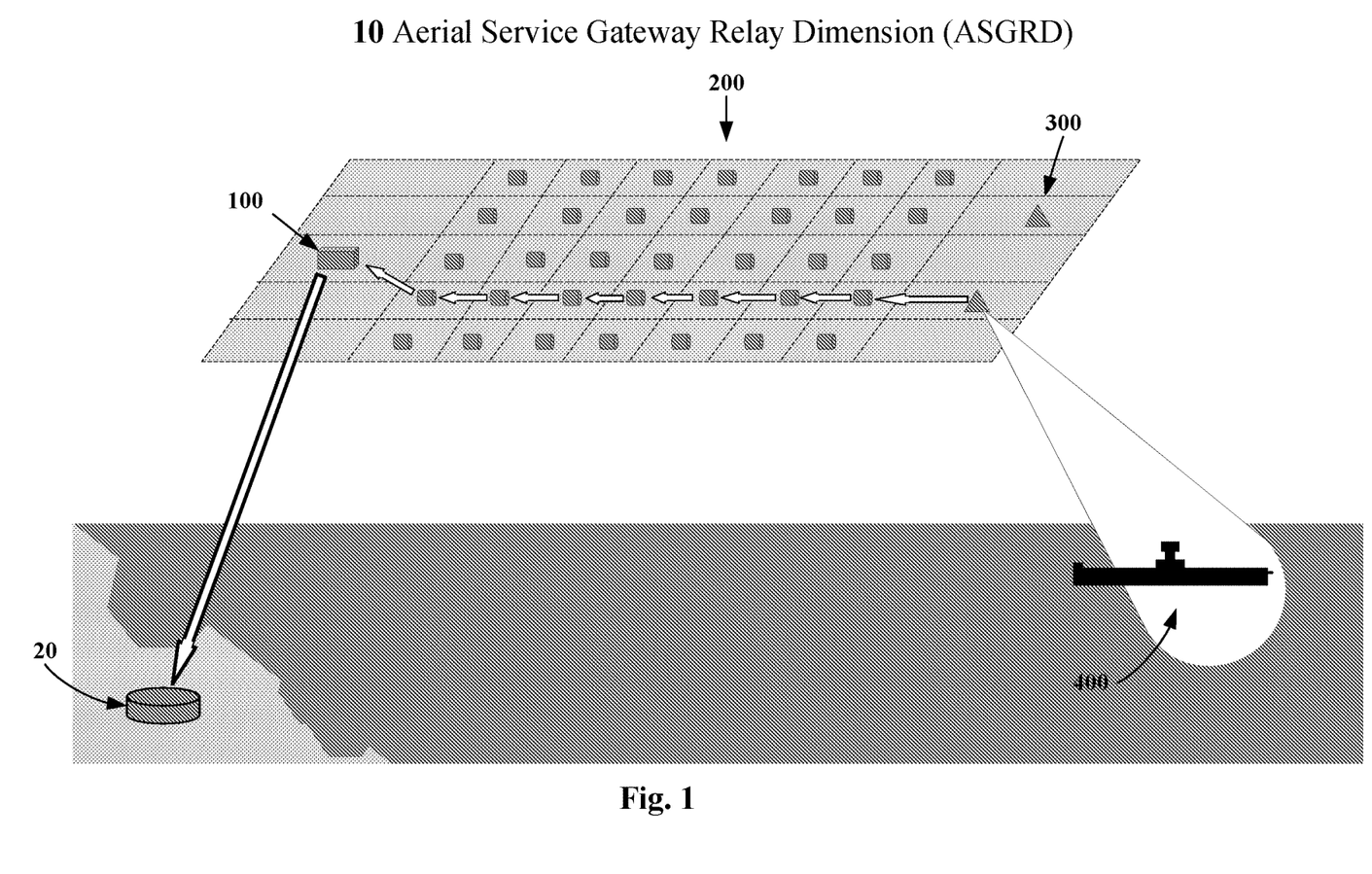
FIG. 1 is an example illustration of an Aerial Service Gateway Relay Dimension.

FIG. 1 is an example illustration of an Aerial Service Gateway Relay Dimension ("ASGRD") 10 comprising a plurality of target homeport node 100, a plurality of comms-relay nodes 200, and a plurality of sensor nodes 300; and further illustrates a central processing node 20 and an object of interest 400. ASGRD is a mobile ad hoc network in which each of the nodes may move in a semi-random fashion where manner where the sensor and Target Homeport nodes are located at the boundary of the entire region defined by the three node types. In one embodiment, nodes are deployed to a designated geographical area to gather information about an object within its sensor range. Each node may be an unmanned vehicle ("UxV") (e.g. air, surface, subsurface) and the network may comprise any combination of UxVs. Additionally, a node may be a sensor-equipped unmanned Aerial Vehicle ("SUAV"). As shown as an example in FIG. 1, the ASGRD may identify a maritime vessel and communicate sensor information associated with that vessel to a central processing node. However, this disclosure is not so limited and such example is merely illustrative. In another embodiment, an ASGRD may include a plurality of target homeport nodes.

Figure 2A:
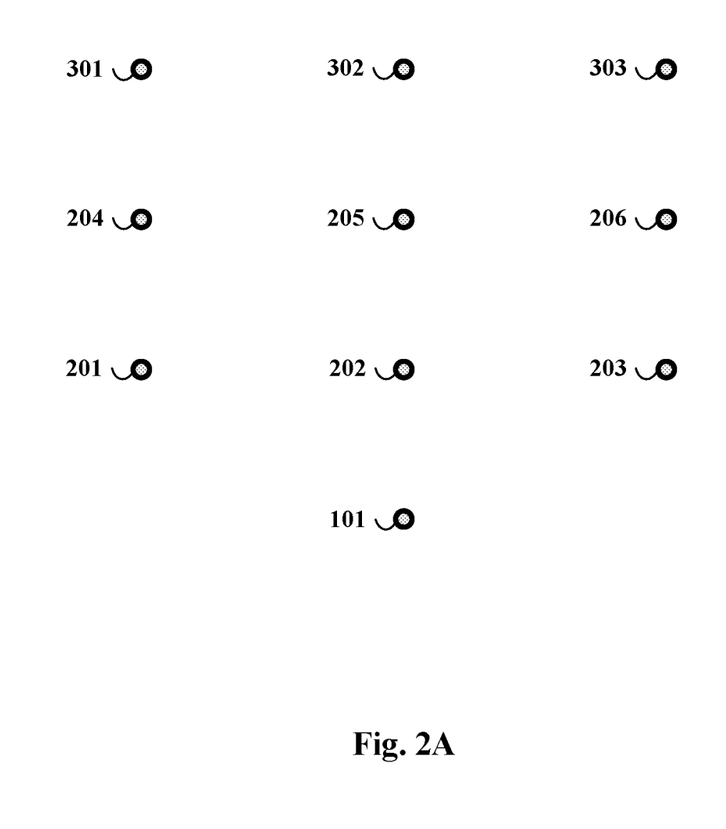
FIG. 2A is a symbolic illustration of a mobile ad hoc network comprising a target homeport node, six comms-relay nodes, and three sensor nodes.

FIG. 2A is a symbolic illustration of a mobile ad hoc network comprising a target homeport node 101, six comms-relay nodes 201-206, and three sensor nodes 301-303. This is one example of a mobile ad hoc network utilizing a THOR protocol that may comprise a plurality of target homeport nodes 100 a plurality of sensor nodes 200, and a plurality of sensor nodes 300. Each node may be designated a role as either a target homeport node 100, a comms-relay node 200, or a sensor node 300. Designating each mobile node reduces network traffic overhead; and by enabling each node to save alternative routes, we empower these nodes to perform reroutes. In FIG. 2A, the target homeport node may communicate with a central processing node outside of the mobile ad hoc network, as shown in FIG. 1. Additionally, a target homeport node 101 has topology that is known to the network. Additionally, the target homeport node 101 has topology that is known to the network. The plurality of comms-relay nodes 200 provide routing service to packs received and may also store routes of neighboring comms-relay nodes. Finally, the sensor nodes 300 may further generate sensor information relevant to an object of interest.

Each of the plurality of nodes (e.g. target homeport, comms-relay, or sensor) may transit messages to nearby node types including, but not limited to, target route messages, sensor messages, and management messages. A nearby node is within line-of-sight of the transmitting node. The first message type, target route messages, are used by a plurality target homeport node 100 to initiate a route to a plurality of sensor nodes 300. Each target route message that is originated will contain the target homeport unique address and a sequence number. The target route message is then transmitted to the plurality of nearby comms-relays nodes 200, which appends their unique addresses within the address field. The target route message is then further propagated from each of the plurality of comms-relay nodes throughout the mobile ad hoc network. As this messages passes from one comms-relay node to another, a route chain is built from the originator's address at the target homeport node and the current node's address, which is handling this message. Eventually, at least one sensor node will receive this message with a path to the target homeport node as indicated by a sequence of addresses. Each sensor node will then contain a route path for transmitting sensor information back to a target homeport node. In scenarios where a sensor node is ready to transmit without a route chain, it would broadcast a request for a route-chain from comms-relay nodes.

Upon receipt of a target route message at each node, each node will store a positive integer of unique route chains ("N"). N is derived from messages with the same source and destination addresses; that is, route chains that contain the same source and destination addresses with different set of intermediate addresses within. The value N may be different for each node however its value set prior to deployment. Computing N will be a factor of the following node attributes: sensor position, the number of communication replays and their relative position, fuel levels, and radio frequency communication specification. Since optimizing N a multi-variant problem, deriving a suitable N may be performed with an engineering level network simulator. The target homeport node will periodically transmit updates target route messages with a new sequence number to ensure routes are up-to-date. Periodicity of transmitting these target homeport messages may be determined by the operator based on consideration that including, but not limited to, the stability of the comms-relay network.

Sensor product messages are sent by a sensor node to target homeport node(s) and may comprise sensor information and an associated route chain. As used herein, the terms "sensor data," "sensor information," or any variation thereof, are intended to cover any data gathered by the plurality of sensor nodes. Each message may be segmented into packets and assigned a sequence number. The contents of sensor information may be, for example, geographical coordinates, images, and more. In one embodiment, an ASGRD may facilitate the transmission of a data package comprising geographical coordinates and/or images. Sensor information may then be transmitted from the plurality of sensor nodes 300, relayed at the plurality of comms-relay nodes 200, and be received at a plurality of target homeport nodes 100.

Management message may sustain the connectivity and resiliency of the routes for the network. Types of management messages include, but are not limited to: "ACK", "NACK", and "NACK-Reroute". ACK may be an acknowledgement sent to the transmitting node that its packet was received by the neighbor node specified in the route-chain. NACK may be sent by a comms-relay node to the sensor node that its packet could not be forwarded. Nack-Reroute may be sent by a comms-relay node to the sensor node alerting that the packed was unable to take the original path that was specified by the route-chain used by the originating sensor node and that it was rerouted with a new route-chain provided. Upon receipt of the Nack-Reroute message, the associated sensor node will update its routing table.

Figure 2B:
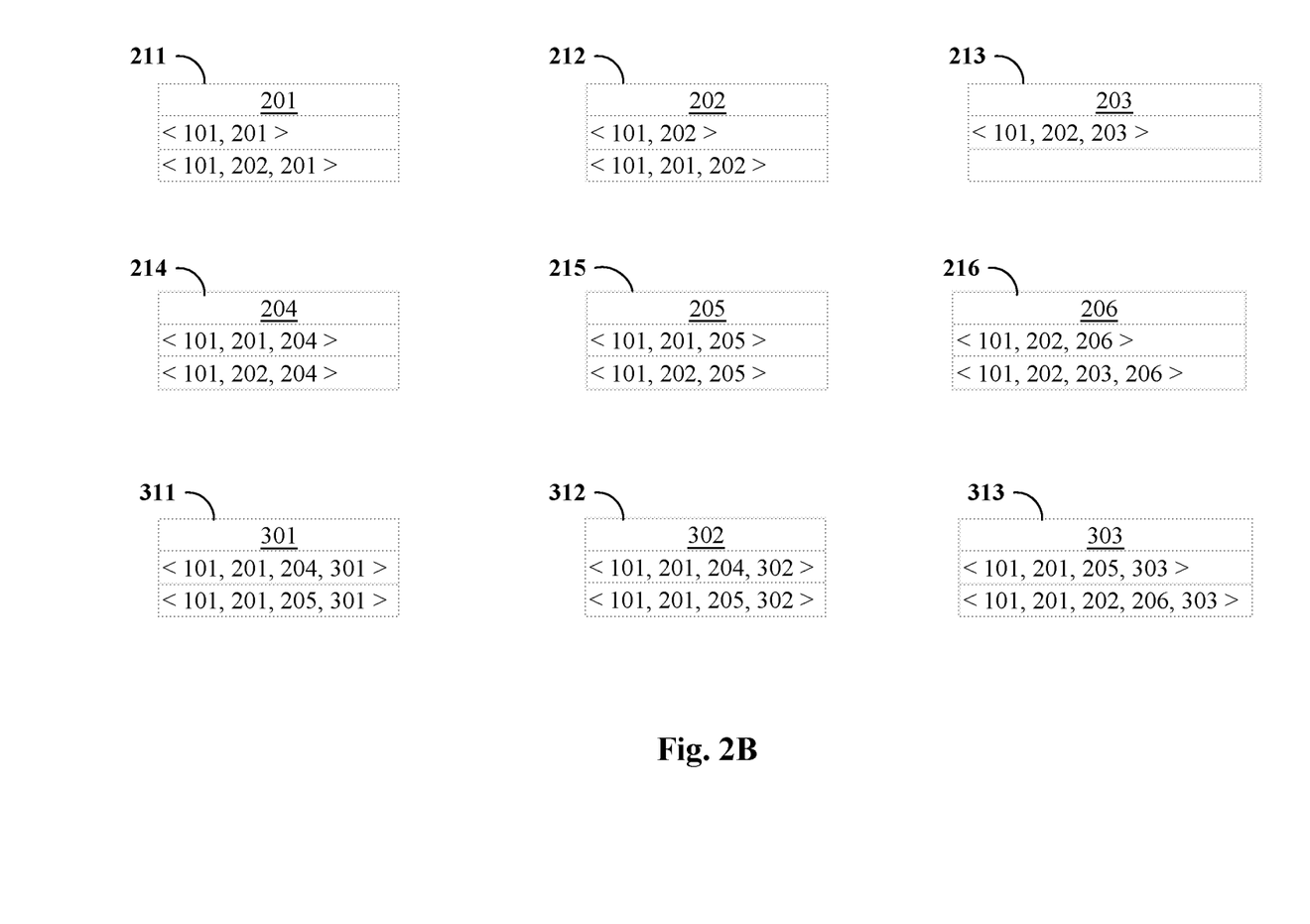
FIG. 2B is an array of routing tables, wherein each table is associated with each of the nodes depicted in FIG. 2A.

FIG. 2B is an array of routing tables 211-216, and 311-313, wherein each table is associated with each of the nodes depicted in FIG. 2A, as indicated by the header (top row) of each table. Each routing table has a plurality of route chains, where the number of route path may be represented as N, as discussed previously. As we can see in FIG. 2B, route chains are indicated by a sequence of nodes within the "<" and ">" symbols and the chain of numbers between the symbols indicates the specific nodes hopped too along the path. Moreover, the number of route chains shown is two (e.g. N=2) and any additional route paths may be eliminated for reasons including, duplication. However, N may be any number of route chains that the wireless node is capable of caching. As discussed previously, N will be unique to sensor position, the number of communication relays and their relative position, fuel levels and radio frequency communication specification.

Each route table comprises a plurality of route chains. For example, the route table for node 201, FIG. 2B, comprises a route chain node 201: <101, 201>. This indicates a route path described a transmission from a target homeport node 101 to a comms-relay node 201. This path may be inverted when transmitting from a plurality of sensor nodes to transmit data from node comms-relay node 201 to target homeport node 101. Alternatively, FIG. 2B comprises an additional route path for node 201<101, 202, 201>, which represents a transmission path starting at the target homeport node 101, relayed to comms-relay node 202, then to comms-relay node 201. Node 201 may store both of these route paths in a route table and periodically update the routing table. Multiple route paths may be stored to create redundancy and improve reliability in the network. When a connection fails between, for example, node 101 and 201, the routing table at node 201 may update to reprioritize transmission along the route chain: <101, 202, 201>. In one embodiment, the network is updated every 15 milliseconds. Dynamic rerouting information allows for increased reliability and stability of the network in response to changing network conditions.

Figure 3:
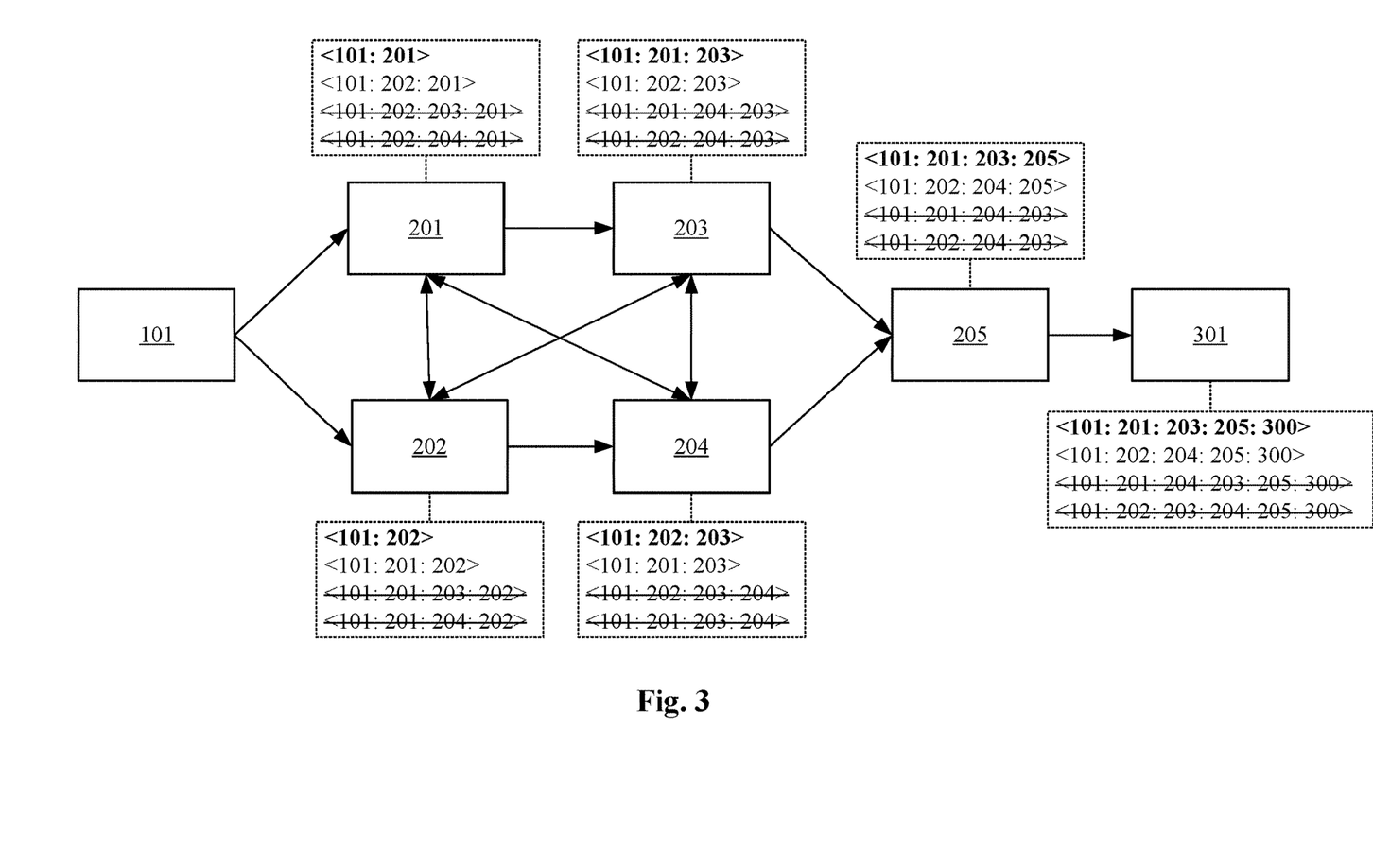
FIG. 3 is a block-diagram illustration of a mobile ad hoc network comprising a target homeport node, a plurality of comms-relay nodes, a sensor node, and associated routing tables.

FIG. 3 is a block-diagram illustration of a mobile ad hoc network comprising a target homeport node 101, a plurality of comms-relay nodes 201-205, a sensor node 301, and associated routing tables. This mobile ad hoc network utilizes a THOR protocol to initialize and prioritize a route path from a sensor node 301 to a target homeport node 101. Each block is a distinct node in the network. Arrows connecting the nodes indicate a transmission to establish a route path. The dotted lines indicate a routing table associated with each node, each containing route chains listed by priority. The highest priority route chain may be referred to as the primary route chain, and is bolded in FIG. 3. The primary route chain may be selected for reasons including, but not limited to, the route path's latest sequence number form the target homeport node, the least number of hops from the target homeport node, the least congested links, delay, or order of receipt. These reasons may be referred to as the optimized metric.

For example, the primary route chain at sensor node 301, <101:201:203:205:300>, is selected based on the sequence number and least number of hops to target homeport node 101. Its route chain facilitates the transmission of sensor information from sensor node 300 to comms-relay node 205, comms-relay node 203, comms-relay node 201, and target homeport node 101. However, alternate route paths are also stored in case of link failure. In such cases, that node experienced transmission failure will reroute according to the next priority route chain. Therefore, the THOR protocol may enable intermediate nodes to maintain primary and alternative routing to neighbors through passive collection to maintain resiliency in route in case of link failures.

FIG. 3 further comprises route chains having strike-through lines, which represent eliminated route paths. The THOR protocol may eliminate route chain paths that are either redundant or determined to be too long compared to alternatives. The number of paths eliminated is related to how many route chains each table stores, N, and is selected based characteristics of the individual network. The primary route chain may also change dynamically with changes in network conditions as the routing table updates at each node. This may result in some route chains being eliminated or added as the network topology changes. Accordingly, the THOR protocol enables a mobile ad hoc network to maintain alternative paths to the destination at all nodes.

Figure 4:
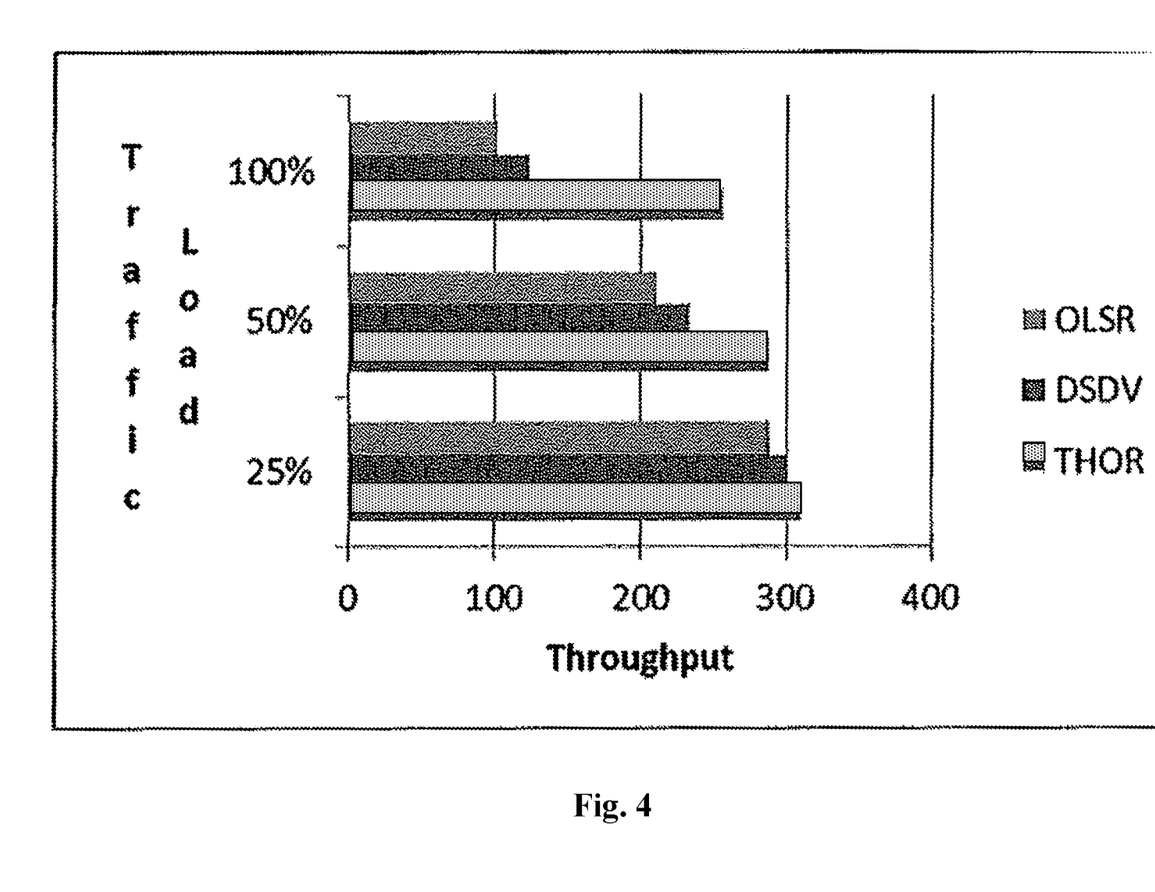
FIG. 4 is a graphic comparison of the THOR protocol against OLSR and DSDV protocols regarding traffic load and throughput.

FIG. 4 is a graphic comparison of the THOR protocol against OLSR and DSDV protocols regarding traffic load and throughput. These results were derived from a NS-3 simulation with subsequent analysis performed in Mathematica. NS-3 is a discrete-time network and communication simulation environment used to model IP and non-IP networks and communication environments. NS-3 is based on C++ and python. The NS-3 has several models of ad-hoc protocols including AODV, OLSR, DSDV, and DSR. This analysis compares throughput at network traffic loads of 25%, 50% and 100%. In the case of 25% loading, it is assumed that one of four sensors has traffic to send, while 50% and 100% represent that two and four sensor nodes respectively have traffic to send. Again, this analysis is merely illustrative of this disclosure in specific, simulated embodiments, and does not constitute a limit the disclosure herein.

As shown in FIG. 4, the THOR protocol outperforms the OLSR and DSDV protocols at an increasing margin as throughput escalates. The THOR protocol provides higher throughput due to its ability to quickly utilize alternate routes. These alternate route chains enable quick rerouting of traffic that would otherwise result in packet drops or a significant time in queuing. In DSDC and OLSR protocols, each require updates to the routing table and hence there is a delay while waiting for an updated route that impacts throughput. Again, this analysis is merely illustrative of this disclosure in specific, simulated embodiments, and does not constitute a limit the disclosure herein.

Figure 5:
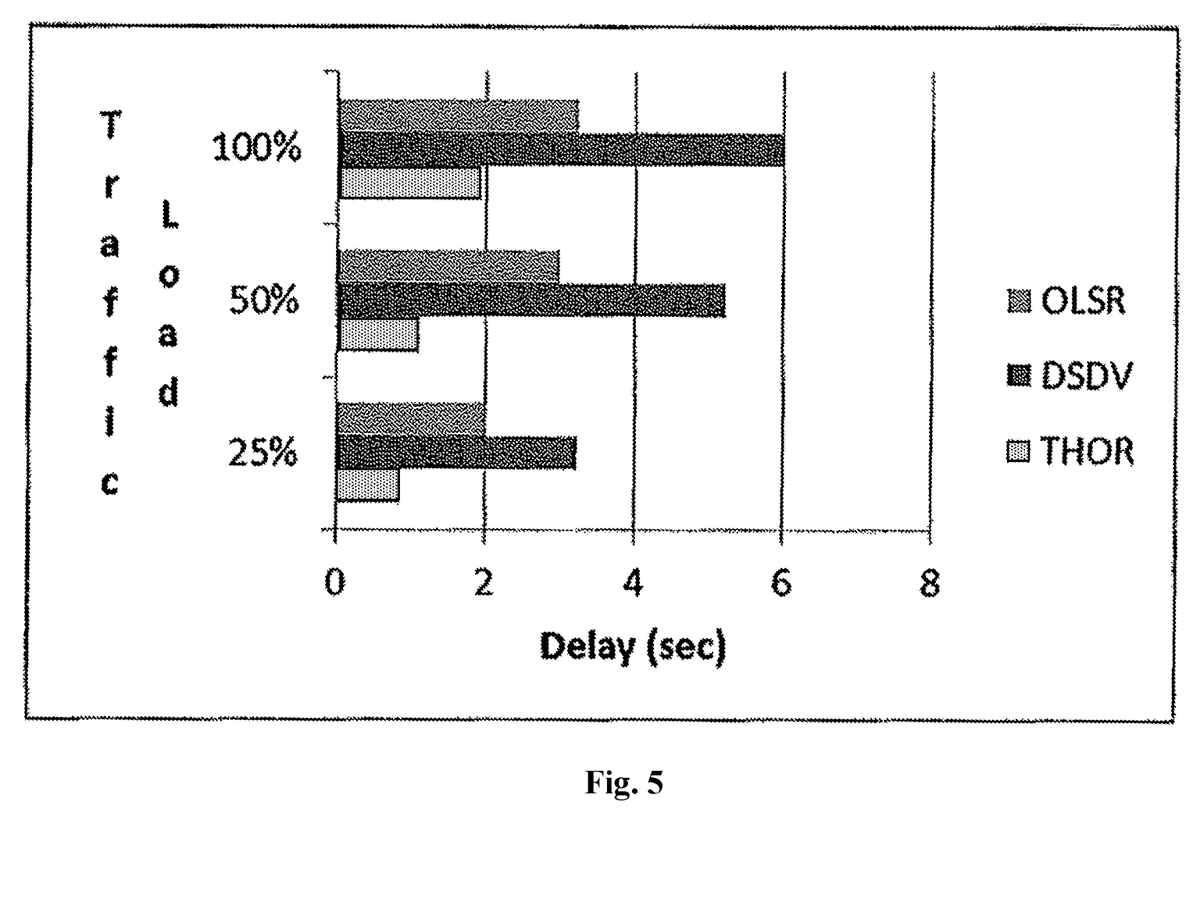
FIG. 5 is a graphic comparison of the THOR protocol against OLSR and DSDV regarding traffic load and delay.

FIG. 5 is a graphic comparison of the THOR protocol against OLSR and DSDV regarding traffic load and delay, where delay is measured from the time a packet departs a sensor node and is received at the queue within the target homeport node. Like FIG. 4, the OLSR and DSDV protocols require updates to the routing table to enable reroutes when traffic is heavy, therefore increasing delay. The THOR protocol may rely on alternate routes previously stored within each node to enable efficient transmission of packets to a destination. Thus, the THOR network is advantageous over OLSR and DSDV protocols concerning delay. Again, this analysis is merely illustrative of this disclosure in specific, simulated embodiments, and does not constitute a limit the disclosure herein.

Figure 6:
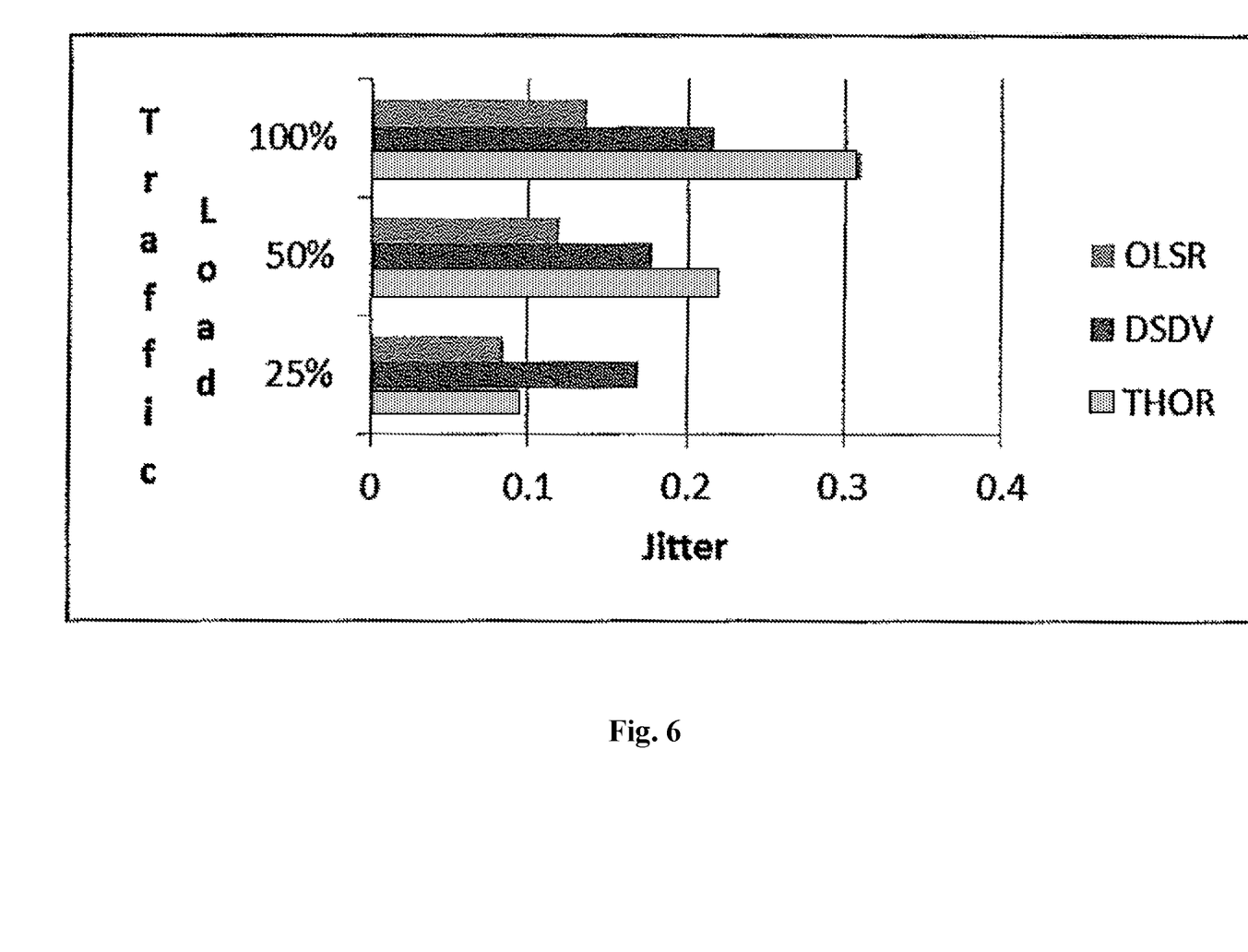
FIG. 6 is a graphic comparison of the THOR protocol against OLSR and DSDV protocols regarding traffic load and jitter.

Finally, FIG. 6 is a graphic comparison of the THOR protocol against OLSR and DSDV protocols regarding traffic load and jitter. Jitter is calculated as a variant of transmission delay. The larger jitter incurred by THOR is due to the initial delay that occurs to update the source routing tables, along with the intermediate nodes. The problem of jitter is typically more exaggerated for larger data packages, such as video. For example, when geographical coordinates or images, network congestion and jitter may decreases. Accordingly, those characteristics of the THOR network are reflected in FIG. 6. Again, this analysis is merely illustrative of this disclosure in specific, simulated embodiments, and does not constitute a limit the disclosure herein.

Figure 7:
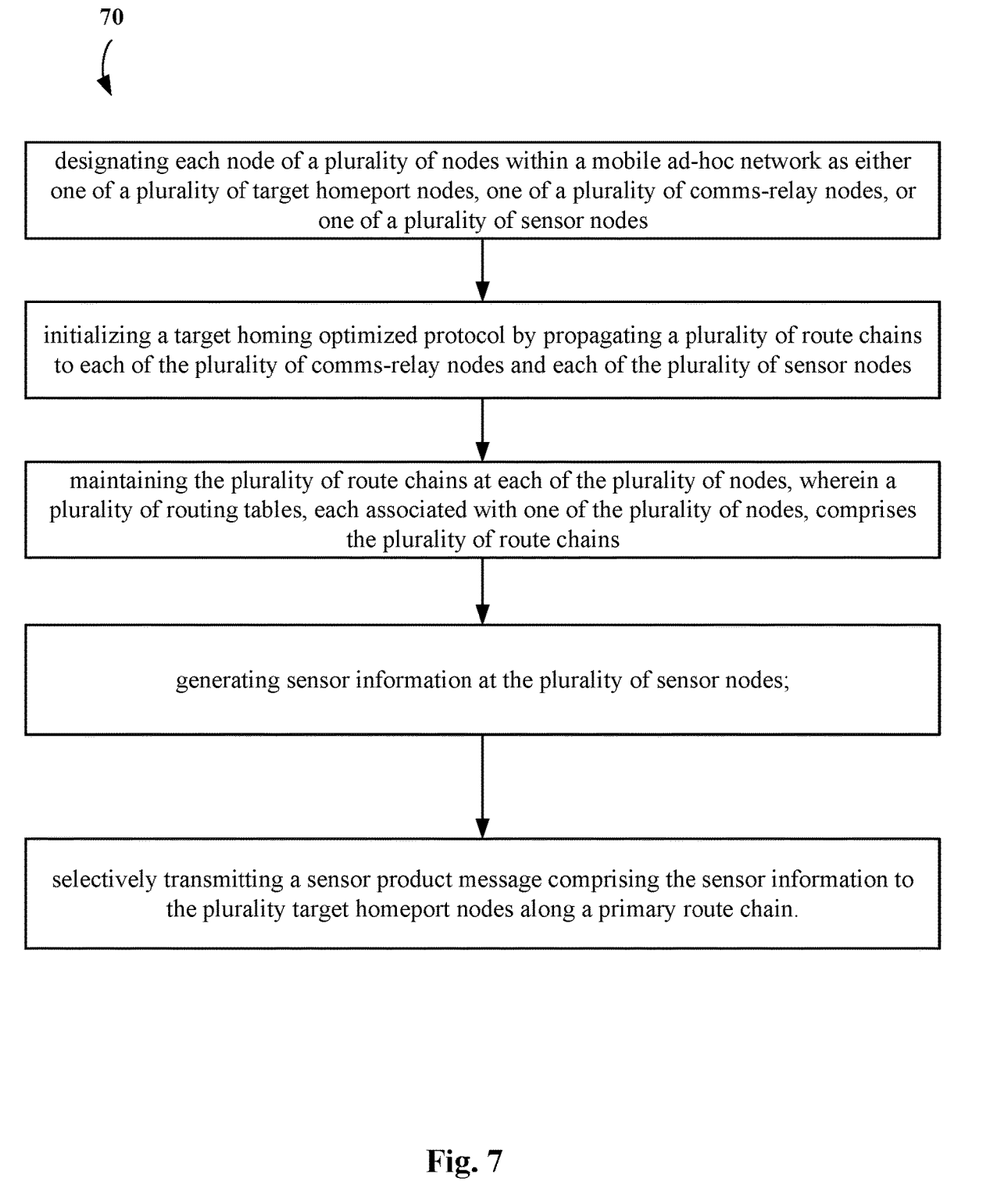
FIG. 7 is a block-diagram illustration of a method of proactive routing.

FIG. 7 is a method of proactive routing 70 comprising the steps of designating each node of a plurality of nodes within a mobile ad-hoc network as either one of a plurality of target homeport node, one of a plurality of comms-relay node, or one of a plurality of sensor nodes, initializing a target homing optimized protocol by propagating a plurality of route chains to each of the plurality of comms-relay nodes and each of the plurality of sensor nodes, maintaining the plurality of route chains at each of the plurality of nodes, wherein a plurality of routing tables, each associated with one of the plurality of nodes, comprises the plurality of route chains, generating sensor information at the plurality of sensor nodes, and selectively transmitting the sensor information to the plurality target homeport nodes along a primary route chain. Moreover, the method of proactive routing of claim 1, wherein initializing a target homing optimized protocol further comprises initiating a route message at each of the plurality of target homeport nodes, the route message comprising each target homeport's address and a sequence number; receiving the route message at a plurality of comms-relay nodes within line of sight of the at least one target homeport node; caching the route message in the routing table at each of the plurality of comms-relay nodes, wherein the route message comprises the route chain associated with a pathway from the target homeport node to each of the plurality comms-relay node; appending a unique address associated with each of the comms-relay node to the route message; transmitting the route message to the plurality of comms-relay nodes or a plurality of nearby sensor nodes within line of sight; and repeating steps (b)-(e) at each of the comms-relay nodes until the route message is received by the plurality of sensors nodes, wherein the route message comprises a route chain from each of the plurality of sensor nodes to the target homeport node.

From the above description of a Target Homing Optimized Routing Protocol over an Aerial Service Gateway Relay Domain, it is manifest that various techniques may be used for implementing the concepts of a method of proactive routing, at least one non-transitory computer-readable medium, storing program instruction that when executed by a processor perform a method of proactive routing, and a mobile ad-hoc network of unmanned vehicles without departing from the scope of the claims. The described embodiments are to be considered in all respects as illustrative and not restrictive. The method, apparatus, and system disclosed herein may be practiced in the absence of any element that is not specifically claimed and/or disclosed herein. It should also be understood that the a method of proactive routing, at least one non-transitory computer-readable medium, storing program instruction that when executed by a processor perform a method of proactive routing, and a mobile ad-hoc network of unmanned vehicles is not limited to the particular embodiments described herein, but is capable of many embodiments without departing from the scope of the claims.

What is claimed:

1. A method of proactive routing in a mobile ad-hoc network of unmanned vehicles, comprising the steps of:
   designating each node of a plurality of nodes within a mobile ad-hoc network as either one of a plurality of target homeport nodes, one of a plurality of comms-relay nodes, or one of a plurality of sensor nodes;
   initializing a target homing optimized routing protocol by initiating, at each target homeport node, a route message comprising the target homeport's address and a sequence number, and propagating the route message through the plurality of comms-relay nodes and sensor nodes such that each comms-relay node and sensor node caches the route message and appends its unique address to form a plurality of route chains;
   maintaining the plurality of route chains at each of the plurality of nodes, wherein a plurality of routing tables, each associated with one of the plurality of nodes, comprises the plurality of route chains;
   selecting, at each sensor node, a primary route chain from the routing table based on an optimized metric comprising at least one of sequence number, hop count, link congestion, delay, or order of receipt, and eliminating duplicated route paths;
   generating sensor information at the plurality of sensor nodes; and
   selectively transmitting a sensor product message comprising the sensor information only along the selected primary route chain to at least one of the plurality target homeport nodes.

2. In a mobile ad-hoc network of unmanned vehicles a method of initializing a target homing optimized protocol comprising the steps of:
   a) initiating a route message at each of the plurality of target homeport node, the route message comprising each target homeport's address and a sequence number;
   b) receiving the route message at a plurality of comms-relay nodes near the target homeport node;
   c) caching the route message in a routing table at each of the plurality of comms-relay nodes, wherein the route message comprises a route chain associated with a pathway from the target homeport node to each of the plurality comms-relay node;
   d) appending a unique address associated with each of the comms-relay node to the route message;
   e) transmitting the route message to the plurality of nearby comms-relay nodes or a plurality of nearby sensor nodes;
   f) repeating steps (b)-(e) until the route message is received by a plurality of sensors nodes, wherein the route message comprises a route path from each of the plurality of sensor nodes to the target homeport node.

3. The method of proactive routing of claim 2, wherein the primary route chain is the route chain having a latest sequence number from the target homeport node.

4. The method of proactive routing of claim 2, wherein the primary route chain is the route chain selected by an optimization metric.

5. The method of proactive routing of claim 2, wherein the primary route chain is the route chain that has most recently been received at the sensor node.

6. The method of proactive routing of claim 2, wherein maintaining the routing table further comprises: eliminating duplicated route paths.

7. The method of proactive routing of claim 2, wherein each of the plurality of nodes is an unmanned aerial vehicle.

8. A non-transitory computer-readable medium storing program instructions that, when executed by a processor, perform a method of proactive routing comprising:
   a) initiating a route message at each of the plurality of target homeport node, the route message comprising each target homeport's address and a sequence number;
   b) receiving the route message at a plurality of comms-relay nodes near the target homeport node;
   c) caching the route message in a routing table at each of the plurality of comms-relay nodes, wherein the route message comprises a route chain associated with a pathway from the target homeport node to each of the plurality comms-relay node;
   d) appending a unique address associated with each of the comms-relay node to the route message;
   e) transmitting the route message to the plurality of nearby comms-relay nodes or a plurality of nearby sensor nodes;
   f) repeating steps b-e until the route message is received by a plurality of sensors nodes, wherein the route message comprises a route path from each of the plurality of sensor nodes to the target homeport node.

9. The at least one non-transitory computer-readable medium; of claim 8, wherein a primary route chain is selected from among multiple stored route chains at the sensor node based on a dynamic optimization metric comprising at least one of: sequence freshness from the target homeport node, least number of hops, minimal latency, link stability, or order of receipt.

10. The at least one non-transitory computer-readable medium, storing program instruction that when executed by a processor perform a method of proactive routing of claim 8, wherein each of the plurality of nodes is an unmanned aerial vehicle.

11. A mobile ad-hoc network of unmanned vehicles, comprising:
   a plurality of wireless mobile nodes, further comprising:
      a plurality of sensor nodes configured to generate sensor information;
      a plurality of comms-relay nodes configured to relay the sensor information;
      a plurality target homeport nodes configured to transmit to a central processing node;
      wherein each of the plurality of nodes maintains a routing table comprising a plurality of route chains, and wherein a primary route chain is selected based on a latest sequence number from a target homeport node, and duplicate route paths are eliminated; and
      wherein the plurality of nodes selectively transmit the sensor information to at least one target homeport node along the primary route chain.

12. The mobile ad-hoc network of unmanned vehicles of claim 11, wherein each of the plurality of nodes is an unmanned aerial vehicle.

13. The mobile ad-hoc network of unmanned vehicles of claim 11, wherein the primary route chain is selected using a dynamic optimization metric comprising node health status, real-time congestion feedback, and link degradation history.

14. The mobile ad-hoc network of unmanned vehicles of claim 11, wherein the primary route chain is the chain most recently received and acknowledged at the sensor node, with prior chains demoted based on usage frequency and stability.

15. The mobile ad-hoc network of unmanned vehicles of claim 11, wherein duplicated route paths are identified across the routing tables by comparing chain address patterns and eliminated based on duplication count and relative performance degradation, thereby reducing network overhead.

\* \* \* \* \*